United States Patent
Kanai (10) Patent No.: US 10,692,338 B2
(45) Date of Patent: Jun. 23, 2020

(54) HAPTIC OUTPUT DEVICE (71) Applicant: Nidec Seimitsu Corporation, Ueda-shi, Nagano-ken (JP)

(72) Inventor: Naoki Kanai, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 0 days.

(21) Appl. No.: 16/365,719

(22) Filed: Mar. 27, 2019

(65) Prior Publication Data

US 2019/0304267 A1 Oct. 3, 2019

(30) Foreign Application Priority Data

Mar. 29, 2018 (JP) ................... 2018-065101

(51) Int. Cl.
*G06F 3/00* (2006.01)
*G08B 6/00* (2006.01)
*H02P 25/032* (2016.01)
*G06F 3/01* (2006.01)
*B06B 1/02* (2006.01)

(52) U.S. Cl.
CPC .............. *G08B 6/00* (2013.01); *B06B 1/0215* (2013.01); *G06F 3/016* (2013.01); *H02P 25/032* (2016.02)

(58) Field of Classification Search
CPC ....... G08B 6/00; B06B 1/0215; H02P 25/032; G06F 3/016
See application file for complete search history.

(56) References Cited

U.S. PATENT DOCUMENTS

| 9,489,047 B2* | 11/2016 | Jiang ................. G06F 3/0416 |
| 2006/0119573 A1* | 6/2006 | Grant ................. B06B 1/0215 345/156 |
| 2007/0202841 A1* | 8/2007 | Cruz-Hernandez ......... B06B 1/0215 455/403 |
| 2008/0216001 A1* | 9/2008 | Ording ................. G06F 3/044 715/763 |
| 2011/0163985 A1* | 7/2011 | Bae ................. G06F 3/016 345/173 |
| 2016/0063826 A1* | 3/2016 | Morrell ............... H04M 19/047 340/407.1 |
| 2017/0090574 A1* | 3/2017 | Baer ................. G06F 3/016 |
| 2018/0159457 A1* | 6/2018 | Eke ................. H02P 25/032 |
| 2018/0229116 A1* | 8/2018 | Rihn ................. A63F 13/24 |

* cited by examiner

*Primary Examiner* — Munear T Akki
(74) *Attorney, Agent, or Firm* — Keating & Bennett (57) ABSTRACT

A haptic output device includes an actuator that provides a haptic effect and a signal transmitter that transmits a driving signal and a braking signal to the actuator. The driving signal includes a first driving waveform in a first half cycle, a second driving waveform, following the first driving waveform, in a second half cycle, and a third driving waveform, following the second driving waveform, in a third half cycle. The braking signal includes a braking waveform following the third driving waveform. The polarities of the voltage values of the first driving waveform and second driving waveform are opposite to each other. The polarities of the voltage values of the second driving waveform and third driving waveform are opposite to each other. The braking waveform has a phase opposite to the phase of the driving signal. The third driving waveform has a higher frequency than the first driving waveform.

7 Claims, 6 Drawing Sheets

HAPTIC OUTPUT DEVICE

CROSS REFERENCE TO RELATED APPLICATION

This application claims the benefit of priority to Japanese Patent Application No. 2018-065101 filed on Mar. 29, 2018. The entire contents of this application are hereby incorporated herein by reference.

1. FIELD OF THE DISCLOSURE

The present disclosure relates to a haptic output device.

2. BACKGROUND

A conventionally developed haptic output device mounted in any type of units can give haptic feedback to the user of the unit. The haptic output device has an actuator that provides a haptic effect. To provide a haptic effect, the actuator outputs vibration.

When the actuator is driven, the user is given haptic feedback through vibration generated in the unit in which the haptic output device is mounted. When a brake is applied to the actuator, the vibration is attenuated. If a speed at which the vibration is attenuated during braking, an undesirable feeling is given to the user. In view of this, Japanese Unexamined Patent Application Publication No. 2014-170534 discloses an example of a conventional haptic output device.

The haptic output device in Japanese Unexamined Patent Application Publication No. 2014-170534 has a processor and an actuator that provides a haptic effect. The processor transmits a driving signal and a braking signal to the actuator. The processor transmits the braking signal before or at the same time as when the driving signal is stopped. The frequency of the braking signal is essentially the same as the resonant frequency of the actuator. The phase of the braking signal is opposite to the phase of the driving signal. The driving signal and braking signal have the same frequency.

With the haptic output device disclosed in Japanese Unexamined Patent Application Publication No. 2014-170534, however, although a vibration convergence period from when driving starts until vibration converges due to a brake can be shortened, no consideration is given to increasing the amount of vibration during the vibration convergence period.

SUMMARY

Example embodiments of the present disclosure provide haptic output devices that each increase an amount of vibration during a vibration convergence period without having to prolong the vibration convergence period.

A haptic output device according to an example embodiment of the present disclosure includes an actuator that provides a haptic effect and a signal transmitter that transmits a driving signal and a braking signal to the actuator. The driving signal includes a first driving waveform in a first half cycle, a second driving waveform, which follows the first driving waveform, in a second half cycle, and a third driving waveform, which follows the second driving waveform, in a third half cycle. The braking signal includes a braking waveform, which follows the third driving waveform. The voltage value of the second driving waveform has a polarity opposite to the polarity of the voltage value of the first driving waveform. The voltage value of the third driving waveform has a polarity opposite to the polarity of the voltage value of the second driving waveform. The braking waveform has a phase opposite to the phase of the driving signal. The frequency of the third driving waveform is higher than the frequency of the first driving waveform.

The above and other elements, features, steps, characteristics and advantages of the present disclosure will become more apparent from the following detailed description of example embodiments with reference to the attached drawings.

DETAILED DESCRIPTION

Exemplary embodiments of the present disclosure will be described below with reference to the drawings.

1. Structure of a Haptic Output Device

Figure 1:
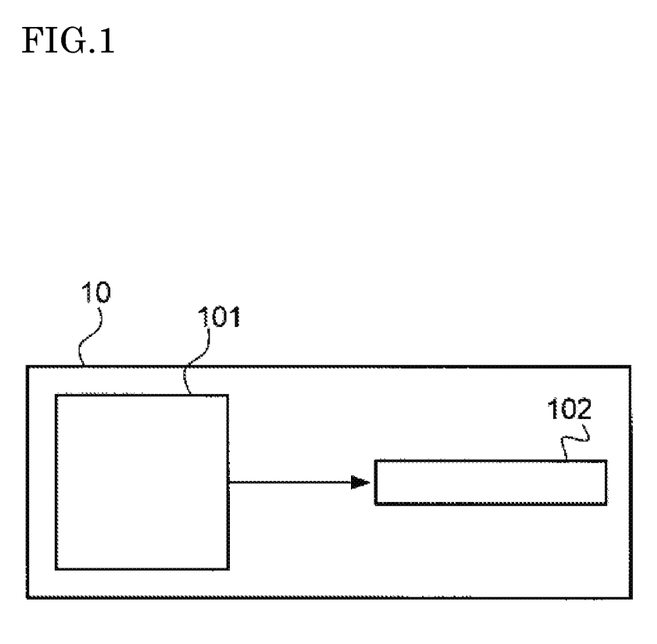
FIG. 1 is a block diagram illustrating the structure of a haptic output device according to an example embodiment of the present disclosure.

FIG. 1 is a block diagram illustrating the structure of a haptic output device 10 according to an exemplary embodiment of the present disclosure. As illustrated in FIG. 1, the haptic output device 10 has a processor 101 and an actuator 102.

The processor 101, which is a controller that performs various types of control, outputs a driving signal and a braking signal to the actuator 102 so that the actuator 102 is driven and a brake is applied to it. That is, the processor 101 functions a signal transmitting unit that transmits a driving signal and a braking signal to the actuator 102.

The actuator 102, which has a function to cause vibration, gives haptic feedback to the user of a device in which the actuator 102 is mounted by generating vibration in the device. That is, the actuator 102 provides a haptic effect. A specific example of the structure of the actuator 102 will be described below. However, the structure of the actuator 102 is not limited to the example.

2. Example of the Structure of the Actuator

An example of the structure of the actuator 102 included in the haptic output device 10 will be described below with reference to FIG. 2.

Figure 2:
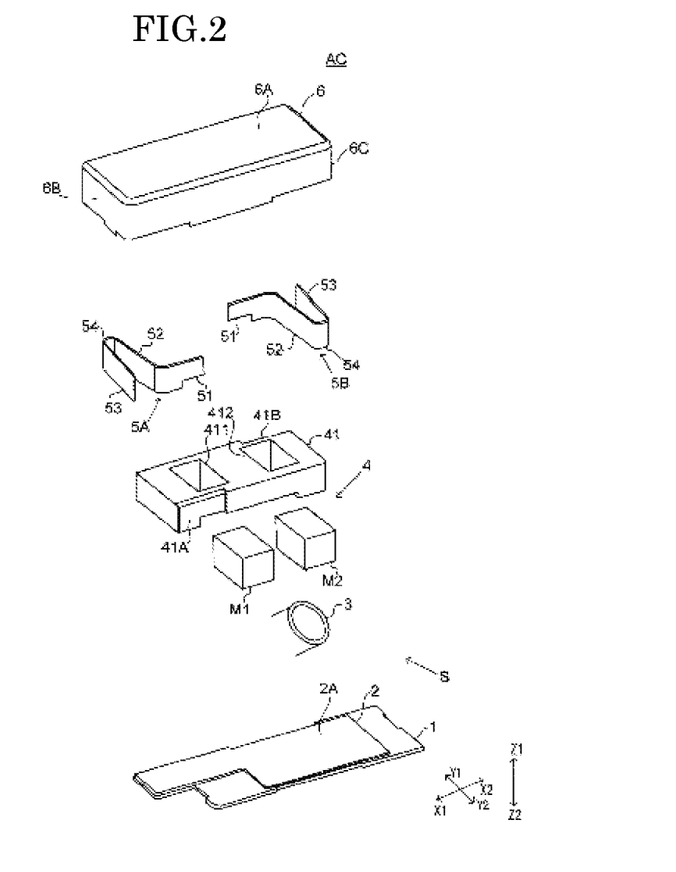
FIG. 2 is an exploded perspective view of an actuator according to an example embodiment of the present disclosure.

FIG. 2 is an exploded perspective view of an actuator AC, which is an example of the actuator 102. The actuator AC in FIG. 2 is structured as a horizontal linear vibration motor. In FIG. 2, the transverse direction is indicated as the X direction, the longitudinal direction is indicated as the Y direction, and the vertical direction is indicated as the Z direction. Specifically, one side in the transverse direction is X1 and the other side is X2; one side in the longitudinal direction is Y1 and the other side is Y2; the upper side in the vertical direction is Z1 and the lower side is Z2.

The actuator AC mainly has a stationary unit S, a vibrating body 4, and elastic members 5A and 5B. The stationary unit S has a base plate 1, a circuit board 2, a coil 3, and a cover 6.

The cover 6 is a member that has an upper surface 6A at the top and the bottom of which is open. Side surfaces 6B and 6C protrude downward from the edges of the upper surface 6A, the edges being opposite to each other in the transverse direction.

The base plate 1 is a plate-like member that expands in the transverse direction and longitudinal direction. The circuit board 2 is fixed to the upper surface of the base plate 1. The circuit board 2 is a flexible printed circuit (FPC) board. However, the circuit board 2 may be a rigid circuit board. The circuit board 2 expands in the transverse direction and longitudinal direction. The transverse direction and longitudinal direction are along the component side 2A of the circuit board 2. Therefore, the vertical direction is the thickness direction of the circuit board 2.

The coil 3 is mounted on the component side 2A of the circuit board 2. The coil 3 is formed by winding a conducting wire around an axis in the vertical direction. The coil 3 is an air-core coil, into which a core (such as an iron core) is not inserted. However, the coil 3 may be a core coil, into which a core is inserted. The lead wire of the coil 3 is electrically connected to a terminal (not illustrated) of the circuit board 2. When a voltage is externally applied to the terminal, a current is supplied to the coil 3.

The vibrating body 4 is placed above the coil 3. The vibrating body 4 has a weight 41, a first magnet M1, and a second magnet M2. The weight 41 is shaped like a substantially rectangular parallelepiped, the edges of which are in the transverse direction, longitudinal direction, and vertical direction. The weight 41 has a first fixing surface 41A and a second fixing surface 41B. The first fixing surface 41A is formed on the one side, in the transverse direction, of a side surface of the weight 41, the side surface being on the other side in the longitudinal direction. The second fixing surface 41B is formed on the other side, in the transverse direction, of a side surface of the weight 41, the side surface being on the one side in the longitudinal direction. That is, the first fixing surface 41A and second fixing surface 41B are diagonally formed.

Openings 411 and 412, which are through-holes extending vertically, are formed in the weight 41 so as to be aligned in the transverse direction. The first magnet M1 is disposed in the opening 411, and the second magnet M2 is disposed in the opening 412.

A pair of elastic members 5A and 5B are fixed to the vibrating body 4. The elastic members 5A and 5B are each a leaf spring member. The elastic member 5A has a fixing part 51, flat plate parts 52 and 53, and a linkage part 54. The fixing part 51 extends in the transverse direction. One end of the flat plate part 52 is joined to one end of the fixing part 51 in the transverse direction. The flat plate part 52 extends from the one end toward the one side in the longitudinal direction. The other end of the flat plate part 52 is linked to one end of the flat plate part 53 through the linkage part 54. The linkage part 54 is bent toward the one side in the longitudinal direction. The flat plate part extends from the one end toward the other side in the longitudinal direction.

The fixing part 51 is fixed to the first fixing surface 41A by, for example, welding. The other end of the flat plate part 53 is fixed to the inner wall surface of the side surface 6B of the cover 6 by, for example, welding.

The elastic member 5B has a structure similar to the structure of the elastic member 5A. However, the elastic member 5B extends from the fixing part 51 to the flat plate part 53 in directions opposite the directions in which the elastic member 5A extends. The fixing part 51 of the elastic member 5B is fixed to the second fixing surface 41B. Therefore, the elastic members 5A and 5B are fixed to the weight 41 at diagonal positions. The flat plate part 53 of the elastic member 5B is fixed to the inner wall surface of the side surface 6C of the cover 6.

Thus, the elastic members 5A and 5B support the cover 6 so that the vibrating body 4 can vibrate in the transverse direction. That is, the elastic members 5A and 5B support the vibrating body 4 so that it can vibrate linearly. When a driving signal or braking signal is transmitted from the processor 101 to the coil 3, a current flows into the coil 3. Then, the coil 3 gives an electromagnetic force to the vibrating body 4 due to an interaction with the first magnet M1 and second magnet M2, causing the vibrating body 4 to vibrate in the transverse direction.

3. Driving and Braking Control

Next, the driving and braking control of the actuator 102 will be described. In the description below, the actuator 102 will be assumed to be the actuator AC (linear vibration motor) described above.

Figure 3:
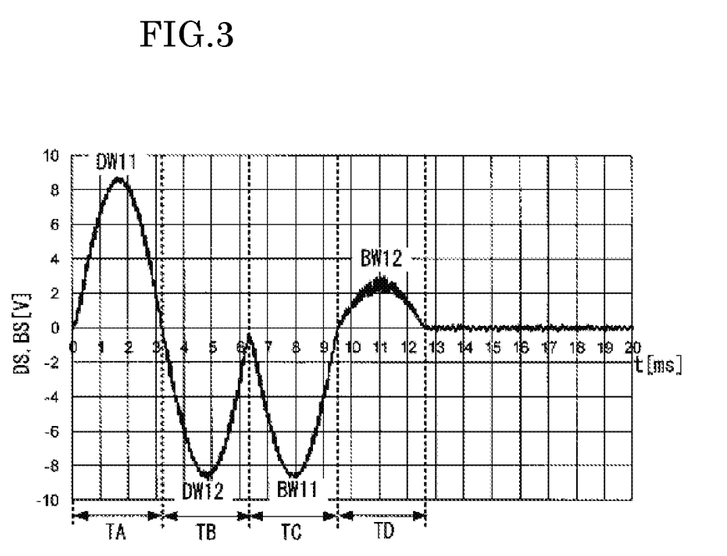
FIG. 3 is a graph indicating the voltage waveforms of a driving signal and a braking signal in a comparative example.

First, driving and braking control in a comparative example compared with the example embodiment of the present disclosure will be described with reference to FIG. 3. FIG. 3 is a graph indicating the voltage waveforms of a driving signal DS and a braking signal BS used in driving and braking control in the comparative example. In FIG. 3, the horizontal axis is a time axis and the vertical axis indicates the voltage values of the driving signal DS and braking signal BS.

In FIG. 3, the driving signal DS has a first driving waveform DW11 and a second driving waveform DW12. The second driving waveform DW12 follows the first driving waveform DW11. The length of the first driving waveform DW11 is the duration of its half cycle equivalent to a segment TA. The second driving waveform DW12 is a waveform in a segment TB, which is slightly shorter than the half cycle of the second driving waveform DW12. The voltage value of the second driving waveform DW12 has a polarity opposite to the polarity of the voltage value of the first driving waveform DW11. The start position of the segment TA is equivalent to 0 [ms] on the time axis.

Also in FIG. 3, the braking signal BS has a first braking waveform BW11 and a second braking waveform BW12. The first braking waveform BW11 follows the second driving waveform DW12. The second braking waveform BW12 follows the first braking waveform BW11. The first braking waveform BW11 starts from the voltage value of the second driving waveform DW12 at the end position of the segment TB. The first braking waveform BW11 is a waveform in a segment TC, which is slightly shorter than the half cycle of the first braking waveform BW11. That is, the first braking waveform BW11 starts at a point in time before the second driving waveform DW12 appears for its half cycle. The length of the second braking waveform BW12 is the duration of its half cycle equivalent to a segment TD. The braking signal BS has a phase opposite to the phase of the driving signal DS. That is, the voltage value of the first braking waveform BW11 has a polarity opposite to the polarity of the voltage value of the first driving waveform DW11, and the voltage value of the second braking waveform BW12 has a polarity opposite to the polarity of the voltage value of the second driving waveform DW12. After the second braking waveform BW12, the voltage value is 0.

The first driving waveform DW11, second driving waveform DW12, first braking waveform BW11, and second braking waveform BW12 are at the same frequency. The first driving waveform DW11, second driving waveform DW12, and first braking waveform BW11 have the same amplitude. The amplitude of the second braking waveform BW12 is smaller than the amplitude of the first driving waveform DW11, second driving waveform DW12, and first braking waveform BW11.

Figure 5:
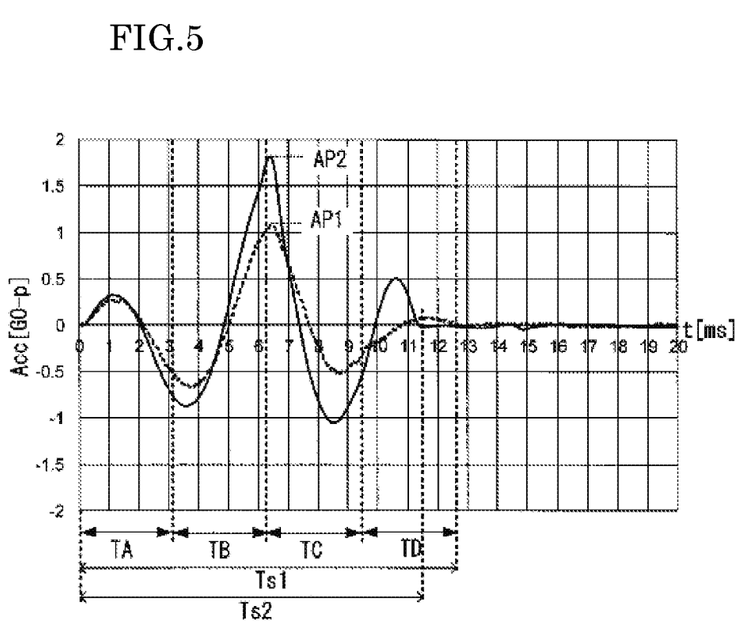
FIG. 5 is a graph illustrating acceleration waveforms of a vibrating body in the actuator.

FIG. 5 is a graph indicting an acceleration waveform of the vibrating body in the actuator with a broken line when driving and braking control are performed by using the driving signal DS and braking signal BS illustrated in FIG. 3. Driving by the driving signal DS starts from 0 [ms] on the time axis and is switched to braking by the braking signal BS at a boundary position between the segment TB and the segment TC, after which vibration converges near the end position of the segment TD. Therefore, a vibration converging period in driving and braking control in the comparative example is a vibration converging period Ts1 illustrated in FIG. 5.

The reason why the amplitude of the second braking waveform BW12 in the segment TD is small is that since the motion of the vibrating body is already small at the start point of the segment TD, even when a brake torque represented by an area enclosed by the second braking waveform BW12 is reduced by reducing the amplitude of the second braking waveform BW12, vibration can be converged.

Figure 4:
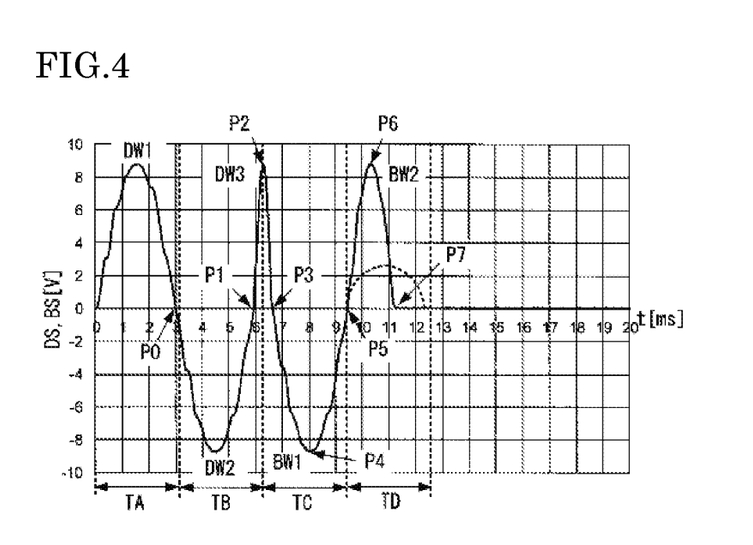
FIG. 4 is a graph indicating the voltage waveforms of a driving signal and a braking signal in an example embodiment of the present disclosure.

Next, driving and braking control in an exemplary embodiment of the present disclosure will be described with reference to FIG. 4. FIG. 4 is a graph indicating the voltage waveforms of the driving signal DS and braking signal BS used in driving and braking control in this example. In FIG. 4, the horizontal axis is a time axis and the vertical axis indicates the voltage values of the driving signal DS and braking signal BS as in FIG. 3.

As illustrated in FIG. 4, a third driving waveform DW3 having a peak at the boundary position between the segment TB and the segment TC is inserted between the waveforms of the driving signal DS and braking signal BS in the comparative example described above with reference to FIG. 3.

In this example embodiment, the braking signal BS has a first driving waveform DW1, a second driving waveform DW2, and the third driving waveform DW3 described above. In FIG. 4, the length of the first driving waveform DW1 is the duration of its half cycle from 0 [ms] to a position P0. The second driving waveform DW2 follows the first driving waveform DW1. The length of the second driving waveform DW2 is the duration of its half cycle from the position P0 to a position P1. The voltage value of the second driving waveform DW2 has a polarity opposite to the polarity of the voltage value of the first driving waveform DW1. The first driving waveform DW1 corresponds to the first driving waveform DW11 in the comparative example. The second driving waveform DW2 corresponds to the second driving waveform DW12 in the comparative example.

The third driving waveform DW3 follows the second driving waveform DW2 and has a peak at a position P2. The length of the third driving waveform DW3 is the duration of its half cycle from the position P1 to a position P3. The position P2 is the boundary position between the segment TB and the segment TC. The voltage value of the third driving waveform DW3 has a polarity opposite to the polarity of the voltage value of the second driving waveform DW2.

The lengths of the half cycles of the first driving waveform DW1 and the second driving waveform DW2 are the same. Since the third driving waveform DW3 is inserted, however, the lengths of the above half cycles are shorter than the length of the half cycle of the first driving waveform DW11 in the comparative example. The amplitude of the first driving waveform DW1 is the same as the amplitude of the first driving waveform DW11 in the comparative example. The amplitude of the second driving waveform DW2 is the same as the amplitude of the second driving waveform DW12 in the comparative example. The amplitude of the third driving waveform DW3 is the same as the amplitude of the first driving waveform DW1.

In this example embodiment, the braking waveform of the braking signal BS has a first braking waveform BW1 and a second braking waveform BW2. The first braking waveform BW1 follows the third driving waveform DW3. The braking signal BS has a phase opposite to the phase of the driving signal DS. That is, the voltage value of the first braking waveform BW1 has a polarity opposite to the polarity of the voltage value of the first driving waveform DW1, and the voltage value of the second braking waveform BW2 has a polarity opposite to the polarity of the voltage value of the second driving waveform DW2.

The length of the first braking waveform BW1 is the duration of its half cycle from a position P3 to a position P5. The position P5 is a boundary position between the segment TC and the segment TD. The first braking waveform BW1 has a peak at a position P4. Since, in this example embodiment, the third driving waveform DW3 is inserted, the length of the half cycle of the first braking waveform BW1 is shorter than the length of the half cycle of the first braking waveform BW1 in the comparative example. The length of the half cycle of the first braking waveform BW1 is the same as the length of the half cycle of the first driving waveform DW1. The amplitude of the first braking waveform BW1 is the same as the amplitude of the first driving waveform DW1.

The length of the second braking waveform BW2 is the duration of its half cycle from the position P5 to a position P7. The second braking waveform BW2 has a peak at a position P6. The amplitude of the second braking waveform BW2 is the same as the amplitude of the first driving waveform DW1. The length of the half cycle of the second braking waveform BW2 is shorter than the length of the half cycle of the first driving waveform DW1. After the second braking waveform BW2, the voltage value is 0.

FIG. 5 is a graph indicting an acceleration waveform of the vibrating body in the actuator with a solid line when driving and braking control are performed by using the driving signal DS and braking signal BS illustrated in FIG. 4. Driving by the driving signal DS starts from 0 [ms] on the time axis and is switched to braking by the braking signal BS at the position P3, after which vibration converges near the position P7. Therefore, a vibration converging period in driving and braking control in this example embodiment is a vibration converging period Ts2 illustrated in FIG. 5. The vibration converging period Ts2 is shorter than the vibration converging period Ts1.

In this example embodiment, the length (from the position P1 to the position P3) of the half cycle of the third driving waveform DW3 is shorter than the length of the half cycle of the first driving waveform DW1. That is, the frequency of the third driving waveform DW3 is higher than the frequency of the first driving waveform DW1. Thus, the length of the half cycle of the third driving waveform DW3 is shortened as much as possible, restraining the vibration converging period Ts2 from being prolonged. Accordingly, an acceleration peak AP2 in this example embodiment can have a larger value than an acceleration peak AP1 in the comparative example, as illustrated in FIG. 5. That is, the amount of vibration in the vibration converging period can be increased. When the amount of vibration is increased, a feeling given to the user is enhanced.

To control the acceleration peak, the length from the position P1 to the position P3 may be prolonged while the area enclosed by the third driving waveform DW3 illustrated in FIG. 4 is maintained by, for example, lowering the peak value at the position P2.

To restrain the vibration converging period from being prolonged, the position P2 needs to be at the boundary position between the segment TB and the segment TC (in the state in FIG. 4) or to be at a position ahead of the boundary position on the time axis.

In other words, the haptic output device 10 in this example embodiment has the actuator 102 that provides a haptic effect and also has the processor 101 that transmits the driving signal DS and braking signal BS to the actuator 102. The driving signal DS has the first driving waveform DW1 in a first half cycle, the second driving waveform DW2, which follows the first driving waveform DW1, in a second half cycle, and the third driving waveform DW3, which follows the second driving waveform DW2, in a third half cycle. The braking signal BS has a braking waveform, which follows the third driving waveform DW3. The voltage value of the second driving waveform DW2 has a polarity opposite to the polarity of the voltage value of the first driving waveform DW1. The voltage value of the third driving waveform DW3 has a polarity opposite to the polarity of the voltage value of the second driving waveform DW2. The braking waveform has a phase opposite to the phase of the driving signal DS. The frequency of the third driving waveform DW3 is higher than the frequency of the first driving waveform DW1.

Thus, the amount of vibration in the vibration converging period can be increased without having to prolong the vibration converging period.

In FIG. 4, the amplitude of the first braking waveform BW1 is the same as the amplitude of the first driving waveform DW1. However, the amplitude of the first braking waveform BW1 may be larger than the amplitude of the first driving waveform DW1. That is, the amplitude of the first braking waveform BW1 in the first half cycle included in the above braking waveform is preferably equal to or larger than the amplitude of the first driving waveform DW1. Thus, it is possible to apply a strong brake during braking.

Also in FIG. 4, the amplitude of the second braking waveform BW2 is the same as the amplitude of the first driving waveform DW1. However, the amplitude of the second braking waveform BW2 may be lower than the amplitude of the first driving waveform DW1, as indicated by the broken line in FIG. 4. That is, the amplitude of the second braking waveform BW2 in the last half cycle included in the above braking waveform is preferably equal to or smaller than the amplitude of the first driving waveform DW1. In a final stage during braking, even when an area (representing a brake torque) enclosed by the second braking waveform BW2 in the last half cycle is reduced, vibration can be attenuated.

The length of the half cycle of the second braking waveform BW2 illustrated in FIG. 4 is shorter than the length of the half cycle of the first driving waveform DW1. That is, the half cycle of the second braking waveform BW2, which is in the last half cycle included in the above braking waveform, is preferably shorter than the first half cycle. In the final stage during braking, even when an area (representing a brake torque) enclosed by the waveform in the last half cycle is reduced, vibration can be attenuated. Furthermore, the vibration converging period can be shortened. The length of the half cycle of the second braking waveform BW2 that is indicated by the broken line in FIG. 4 is the same as the length of the half cycle of the first driving waveform DW1.

The braking signal BS is not limited to the waveforms illustrated in FIG. 4. Additional waveforms may follow the second braking waveform BW2 while their polarities are inverted in succession. That is, the braking signal BS may have three or more braking waveforms.

As described above, the actuator AC, which is an example of the actuator 102, has the vibrating body 4, the elastic members 5A and 5B that support the vibrating body 4 so that it can vibrate linearly, and the coil 3 that gives an electromagnetic force to the vibrating body 4. Thus, when a driving signal and braking signal are supplied to the coil 3, the acceleration peak of the vibrating body 4 can be made large. Therefore, it is possible to increase the amount of vibration in a linear vibration actuator and thereby to give appropriate haptic feedback to the user.

4. Electronic Devices

Figure 6:
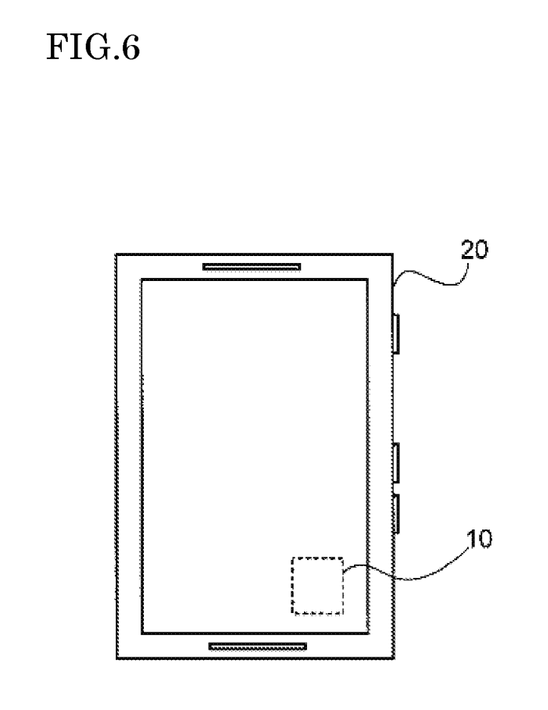
FIG. 6 is an external view illustrating an example of an electronic device in which the haptic output device is mounted.

The haptic output device 10 according to the example embodiment described above can be mounted in any of various electronic devices. FIG. 6 is an external view illustrating an example of an electronic device in which the haptic output device 10 is mounted. The electronic device 20 illustrated in FIG. 6 has the haptic output device 10. In the haptic output device 10, when the actuator 102 is driven and is braked, vibration is generated in the electronic device 20. Thus, haptic feedback can be given to the user of the electronic device 20.

When, for example, the user touches a button-like manipulation part of the electronic device 20 with a finger, the user can receive haptic feedback from the vibrating manipulation part. Therefore, the user can obtain the same click feeling as if the user had pressed the manipulation part. When, for example, the user touches the display part of the electronic device 20 with a finger, the user can receive haptic feedback from the vibrating display part. Therefore, the user can obtain a feeling on a physical surface such as, for example, a smooth felling or coarse feeling.

A tablet computer, a smartphone, or the like is specifically assumed as the electronic device 20. The haptic output device 10 can also be mounted in, for example, a notebook personal computer (PC) or the like.

That is, the electronic device 20 in this example embodiment has the haptic output device 10 described above. Thus, the amount of vibration in the vibration converging period can be increased without having to prolong the vibration converging period. This enables appropriate haptic feedback to be given to the user of the electronic device.

5. Others

So far, an example embodiment of the present disclosure has been described. However, various changes are possible for the example embodiment without departing from the intended scope of the present disclosure.

The present disclosure can be applied to a haptic output device mounted in any of various types of devices.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A haptic output device comprising:
   an actuator that provides a haptic effect; and
   a signal transmitter that transmits a driving signal and a braking signal to the actuator; wherein
   the driving signal includes a first driving waveform in a first half cycle, a second driving waveform, which follows the first driving waveform, in a second half cycle, and a third driving waveform, which follows the second driving waveform, in a third half cycle;
   the braking signal includes a braking waveform, which follows the third driving waveform;
   a voltage value of the second driving waveform has a polarity opposite to a polarity of a voltage value of the first driving waveform;
   a voltage value of the third driving waveform has a polarity opposite to the polarity of the voltage value of the second driving waveform;
   the braking waveform has a phase opposite to a phase of the driving signal;
   a frequency of the third driving waveform is higher than a frequency of the first driving waveform; and
   a total number of waveforms included in all of the first driving waveform, the second driving waveform, and the third driving waveform is not equal to a total number of waveforms included in the braking waveform.

2. The haptic output device according to claim 1, wherein an amplitude of the braking waveform in a first half cycle of the braking waveform is equal to or larger than an amplitude of the first driving waveform.

3. The haptic output device according to claim 1, wherein an amplitude of the braking waveform in a last half cycle of the braking waveform is equal to or smaller than an amplitude of the first driving waveform.

4. The haptic output device according to claim 1, wherein a half cycle of the braking waveform in a last half cycle of the braking waveform is shorter than the first half cycle.

5. The haptic output device according to claim 1, wherein the actuator includes a vibrating body, an elastic member that supports the vibrating body such that the vibrating body vibrates linearly, and a coil that applies an electromagnetic force to the vibrating body.

6. An electronic device comprising the haptic output device according to claim 1.

7. The haptic output device according to claim 1, wherein the braking waveform includes:
   a first braking waveform, which follows the third driving waveform, in a fourth half cycle, and
   a second braking waveform, which follows the first braking waveform, in a fifth half cycle;
   a voltage value of the first braking waveform has a polarity opposite to a polarity of a voltage value of the first driving waveform; and
   a voltage value of the second braking waveform has a polarity opposite to the polarity of the voltage value of the second driving waveform.

* * * * *